(12) United States Patent
Ostrovsky et al.

(10) Patent No.: US 11,720,516 B2
(45) Date of Patent: Aug. 8, 2023

(54) METHODS FOR DATA BUS INVERSION

(71) Applicant: APPLE INC., Cupertino, CA (US)

(72) Inventors: Vadim Ostrovsky, Haifa (IL); Myunghyun Ha, San Jose, CA (US)

(73) Assignee: APPLE INC., Cupertino, CA (US)

( * ) Notice: Subject to any disclaimer, the term of this patent is extended or adjusted under 35 U.S.C. 154(b) by 119 days.

(21) Appl. No.: 17/402,547

(22) Filed: Aug. 15, 2021

(65) Prior Publication Data
US 2023/0052170 A1 Feb. 16, 2023

(51) Int. Cl.
G06F 13/42 (2006.01)
G06F 1/3234 (2019.01)
G06F 13/40 (2006.01)

(52) U.S. Cl.
CPC ........ G06F 13/4221 (2013.01); G06F 1/3253 (2013.01); G06F 13/4072 (2013.01)

(58) Field of Classification Search
CPC . G06F 13/4221; G06F 1/3253; G06F 13/4072
See application file for complete search history.

(56) References Cited

U.S. PATENT DOCUMENTS

| | | | |
|---|---|---|---|
| 7,522,073 B1 * | 4/2009 | Kao | H03M 5/145 710/110 |
| 7,701,368 B2 | 4/2010 | Hollis | |
| 8,451,913 B2 | 5/2013 | Oh et al. | |
| 8,498,344 B2 | 7/2013 | Wilson et al. | |
| 8,510,490 B2 | 8/2013 | Abbasfar | |
| 8,943,382 B2 | 1/2015 | Abbasfar | |
| 9,142,269 B2 | 9/2015 | Hein | |
| 9,252,802 B2 | 2/2016 | Hollis | |
| 9,792,246 B2 | 10/2017 | Teoh et al. | |
| 9,798,693 B2 | 10/2017 | Hollis | |
| 9,922,686 B2 | 3/2018 | Hollis et al. | |
| 10,031,868 B2 | 7/2018 | Mozak et al. | |
| 10,303,629 B2 | 5/2019 | Shu | |
| 10,373,657 B2 | 8/2019 | Kondo et al. | |

(Continued)

FOREIGN PATENT DOCUMENTS

JP 3562644 B2 9/2004

OTHER PUBLICATIONS

Kolor et al., U.S. Appl. No. 17/337,805, filed Mar. 6, 2021.
International Application # PCT/US2022/053576 Search Report dated Mar. 27, 2023.

*Primary Examiner* — Phong H Dang
(74) *Attorney, Agent, or Firm* — Kligler & Associates Patent Attorneys Ltd

(57) ABSTRACT

An electronic device includes a bus driver and circuitry. The bus driver is coupled to a parallel bus including N data lines. The circuitry is configured to receive a data unit for transmission over the N data lines, to determine a first count indicative of a number of data bits in the data unit having a predefined value, and a second count indicative of a number of inverted data bits relative to corresponding bits in a previously transmitted data unit, to make a decision of whether to invert the data unit based on the first and second counts, depending on whether such inversion is expected to reduce power consumption of transmitting the data unit over the bus, to produce an output data unit by retaining or inverting the data unit based on the decision, and to transmit the output data unit over the data lines via the bus driver.

26 Claims, 8 Drawing Sheets

(56) References Cited

U.S. PATENT DOCUMENTS

| | | | |
|---|---|---|---|
| 10,445,288 B2 | 10/2019 | Chu | |
| 10,747,695 B2 | 8/2020 | Ho et al. | |
| 2012/0206280 A1* | 8/2012 | Abbasfar | G06F 13/4204 |
| | | | 341/51 |
| 2015/0139355 A1* | 5/2015 | Hollis | H03K 19/0175 |
| | | | 375/296 |
| 2015/0178237 A1* | 6/2015 | Kesling | H04L 1/20 |
| | | | 375/296 |
| 2016/0019179 A1* | 1/2016 | Loke | G06F 13/4208 |
| | | | 341/58 |
| 2016/0173134 A1 | 6/2016 | Kwon et al. | |
| 2016/0285624 A1 | 9/2016 | Wagh et al. | |
| 2018/0285304 A1* | 10/2018 | Kozhikkottu | G06F 13/36 |
| 2019/0332279 A1 | 10/2019 | Hollis et al. | |
| 2020/0285599 A1* | 9/2020 | Dadual | G06F 13/4234 |
| 2021/0004347 A1 | 1/2021 | Lanka et al. | |

\* cited by examiner

FIG. 3A

| X/T | 0 | 1 | 2 | 3 | 4 | 5 | 6 | 7 | 8 |
|-----|----|----|----|----|----|----|----|----|----|
| 0 | 16 | 14 | 12 | 10 | 8 | 6 | 4 | 2 | 0 |
| 1 | 14 | 12 | 10 | 8 | 6 | 4 | 2 | 0 | -2 |
| 2 | 12 | 10 | 8 | 6 | 4 | 2 | 0 | -2 | -4 |
| 3 | 10 | 8 | 6 | 4 | 2 | 0 | -2 | -4 | -6 |
| 4 | 8 | 6 | 4 | 2 | 0 | -2 | -4 | -6 | -8 |
| 5 | 6 | 4 | 2 | 0 | -2 | -4 | -6 | -8 | -10 |
| 6 | 4 | 2 | 0 | -2 | -4 | -6 | -8 | -10 | -12 |
| 7 | 2 | 0 | -2 | -4 | -6 | -8 | -10 | -12 | -14 |
| 8 | 0 | -2 | -4 | -6 | -8 | -10 | -12 | -14 | -16 |

TABLE 1 - COST VALUES FOR VARIOUS NUMBERS OF '1' BITS
AND BIT-TOGGLES, FOR K=1

FIG. 3B

| X/T | 0 | 1 | 2 | 3 | 4 | 5 | 6 | 7 | 8 |
|-----|----|----|----|----|----|----|----|----|----|
| 0 | 10 | 9.5 | 9 | 8.5 | 8 | 7.5 | 7 | 6.5 | 6 |
| 1 | 8 | 7.5 | 7 | 6.5 | 6 | 5.5 | 5 | 4.5 | 4 |
| 2 | 6 | 5.5 | 5 | 4.5 | 4 | 3.5 | 3 | 2.5 | 2 |
| 3 | 4 | 3.5 | 3 | 2.5 | 2 | 1.5 | 1 | 0.5 | 0 |
| 4 | 2 | 1.5 | 1 | 0.5 | 0 | -0.5 | -1 | -1.5 | -2 |
| 5 | 0 | -0.5 | -1 | -1.5 | -2 | -2.5 | -3 | -3.5 | -4 |
| 6 | -2 | -2.5 | -3 | -3.5 | -4 | -4.5 | -5 | -5.5 | -6 |
| 7 | -4 | -4.5 | -5 | -5.5 | -6 | -6.5 | -7 | -7.5 | -8 |
| 8 | -6 | -6.5 | -7 | -7.5 | -8 | -8.5 | -9 | -9.5 | -10 |

TABLE 2 - COST VALUES FOR VARIOUS NUMBERS OF '1' BITS
AND BIT-TOGGLES, FOR K=4

FIG. 3C

| X/T | 0 | 1 | 2 | 3 | 4 | 5 | 6 | 7 | 8 |
|---|---|---|---|---|---|---|---|---|---|
| 0 | 12 | 11 | 10 | 9 | 8 | 7 | 6 | 5 | 4 |
| 1 | 10 | 9 | 8 | 7 | 6 | 5 | 4 | 3 | 2 |
| 2 | 8 | 7 | 6 | 5 | 4 | 3 | 2 | 1 | 0 |
| 3 | 6 | 5 | 4 | 3 | 2 | 1 | 0 | -1 | -2 |
| 4 | 4 | 3 | 2 | 1 | 0 | -1 | -2 | -3 | -4 |
| 5 | 2 | 1 | 0 | -1 | -2 | -3 | -4 | -5 | -6 |
| 6 | 0 | -1 | -2 | -3 | -4 | -5 | -6 | -7 | -8 |
| 7 | -2 | -3 | -4 | -5 | -6 | -7 | -8 | -9 | -10 |
| 8 | -4 | -5 | -6 | -7 | -8 | -9 | -10 | -11 | -12 |

TABLE 3 - COST VALUES FOR VARIOUS NUMBERS OF '1' BITS AND BIT-TOGGLES, FOR K=2

FIG. 3D

| X/T | 0 | 1 | 2 | 3 | 4 | 5 | 6 | 7 | 8 |
|---|---|---|---|---|---|---|---|---|---|
| 0 | 24 | 20 | 16 | 12 | 8 | 4 | 0 | -4 | -8 |
| 1 | 22 | 18 | 14 | 10 | 6 | 2 | -2 | -6 | -10 |
| 2 | 20 | 16 | 12 | 8 | 4 | 0 | -4 | -8 | -12 |
| 3 | 18 | 14 | 10 | 6 | 2 | -2 | -6 | -10 | -14 |
| 4 | 16 | 12 | 8 | 4 | 0 | -4 | -8 | -12 | -16 |
| 5 | 14 | 10 | 6 | 2 | -2 | -6 | -10 | -14 | -18 |
| 6 | 12 | 8 | 4 | 0 | -4 | -8 | -12 | -16 | -20 |
| 7 | 10 | 6 | 2 | -2 | -6 | -10 | -14 | -18 | -22 |
| 8 | 8 | 4 | 0 | -4 | -8 | -12 | -16 | -20 | -24 |

TABLE 4 - COST VALUES FOR VARIOUS NUMBERS OF '1' BITS AND BIT-TOGGLES, FOR K=0.5

FIG. 3E

| X/T | 0 | 1 | 2 | 3 | 4 | 5 | 6 | 7 | 8 |
|---|---|---|---|---|---|---|---|---|---|
| 0 | 40 | 32 | 24 | 16 | 8 | 0 | -8 | -16 | -24 |
| 1 | 38 | 30 | 22 | 14 | 6 | -2 | -10 | -18 | -26 |
| 2 | 36 | 28 | 20 | 12 | 4 | -4 | -12 | -20 | -28 |
| 3 | 34 | 26 | 18 | 10 | 2 | -6 | -14 | -22 | -30 |
| 4 | 32 | 24 | 16 | 8 | 0 | -8 | -16 | -24 | -32 |
| 5 | 30 | 22 | 14 | 6 | -2 | -10 | -18 | -26 | -34 |
| 6 | 28 | 20 | 12 | 4 | -4 | -12 | -20 | -28 | -36 |
| 7 | 26 | 18 | 10 | 2 | -6 | -14 | -22 | -30 | -38 |
| 8 | 24 | 16 | 8 | 0 | -8 | -16 | -24 | -32 | -40 |

TABLE 5 - COST VALUE FOR VARIOUS NUMBERS OF '1' BITS AND BIT-TOGGLES, FOR K=0.25

FIG. 4

| X\T+D | 0 | 1 | 2 | 3 | 4 | 5 | 6 | 7 | 8 | 9 |
|---|---|---|---|---|---|---|---|---|---|---|
| 0 | Neg | Neg | Neg | Neg | Neg | Neg | Neg | Neg | Neg | Neg |
| 1 | Neg | Neg | Neg | Neg | Neg | Neg | Neg | Neg | Neg | Neg |
| 2 | Neg | Neg | Neg | Neg | Neg | Neg | Neg | Neg | Neg | Neg |
| 3 | Neg | Neg | Neg | Neg | Neg | Neg | Neg | Neg | Neg | Pos |
| 4 | Neg | Neg | Neg | Neg | Neg | Neg | Pos | Pos | Pos | Pos |
| 5 | Neg | Neg | Neg | Neg | Pos | Pos | Pos | Pos | Pos | Pos |
| 6 | Neg | Pos | Pos | Pos | Pos | Pos | Pos | Pos | Pos | Pos |
| 7 | Pos | Pos | Pos | Pos | Pos | Pos | Pos | Pos | Pos | Pos |
| 8 | Pos | Pos | Pos | Pos | Pos | Pos | Pos | Pos | Pos | Pos |

TABLE 7 - SIGNS OF COST VALUES IN EQUATION 3

FIG. 5

| X/T | 0 | 1 | 2 | 3 | 4 | 5 | 6 | 7 | 8 |
|---|---|---|---|---|---|---|---|---|---|
| 0 | 16 | 14 | 12 | 10 | 8 | 6 | 4 | 2 | 0 |
| 1 | 14 | 12 | 10 | 8 | 6 | 4 | 2 | 0 | -2 |
| 2 | 12 | 10 | 8 | 6 | 4 | 2 | 0 | -2 | -4 |
| 3 | 10 | 8 | 6 | 4 | 2 | 0 | -2 | -4 | -6 |
| 4 | 8 | 6 | 4 | 2 | 0 | -2 | -4 | -6 | -8 |
| 5 | 6 | 4 | 2 | 0 | -2 | -4 | -6 | -8 | -10 |
| 6 | 4 | 2 | 0 | -2 | -4 | -6 | -8 | -10 | -12 |
| 7 | 2 | 0 | -2 | -4 | -6 | -8 | -10 | -12 | -14 |
| 8 | 0 | -2 | -4 | -6 | -8 | -10 | -12 | -14 | -16 |

TABLE 10 - COST VALUES FOR EQUAL DC AND AC POWER
CONSUMPTIONS, AND A DECISION LINE FOR
LOW-COMPLEXITY POLARITY BASED DECISION MAKING

METHODS FOR DATA BUS INVERSION

TECHNICAL FIELD

Embodiments described herein relate generally to data transmission, and particularly to methods and systems for improved data bus inversion.

BACKGROUND

Methods for Data Bus Inversion (DBI) aim to reduce power consumption and power noise in transmitting data over a bus. Methods for DBI are known in the art. For example, U.S. Pat. No. 9,798,693 describes a method for data transmission. A signaling speed of operation of an electronic device is determined. A data bus inversion algorithm is selected based on the signaling speed of operation. The selected data bus inversion algorithm is used to encode data. The encoded data and a data bus inversion flag are sent to a receiver over a transmission medium.

U.S. Pat. No. 10,031,868 describes dynamic bus inversion for programmable levels of a ratio of ones and zeros. A transmitting device identifies a number and/or ratio of ones and zeros in a noninverted version of a signal to be transmitted ("noninverted signal") and a number and/or ratio of ones and zeros in an inverted version of the signal ("inverted signal"). The transmitting device can calculate whether a difference of ones and zeros in the noninverted signal or a difference of ones and zeros in the inverted signal provides a calculated average ratio of ones to zeros closer to a target ratio. The transmitting device sends the signal that achieves provides the calculated average ratio closer to the target ratio.

SUMMARY

An embodiment that is described herein provides an electronic device that includes a bus driver and circuitry. The bus driver is coupled to a parallel bus including N data lines, N includes an integer larger than 1. The circuitry is configured to receive a data unit including N data bits, for transmission over the N data lines, to determine, based at least on the data bits in the data unit, (i) a first count indicative of a number of data bits in the data unit having a predefined value, and (ii) a second count indicative of a number of the data bits that are inverted relative to corresponding bits in a previously transmitted data unit, to make a decision based on both the first and the second counts, of whether to invert the data bits in the data unit, depending on whether inversion of the data bits is expected to reduce power consumption of transmitting the data unit over the bus, to produce an output data unit from the data unit, by retaining or inverting the N data bits of the data unit based on the decision, and to transmit the output data unit over the data lines via the bus driver.

In some embodiments, the bus driver is further coupled to a control line carrying a decision signal indicative of the decision, and the circuitry is configured to make the decision also based on an amount of power consumed due to transmission of the decision signal over the control line. In other embodiments, the circuitry is configured to calculate, based on the first and second counts, a power cost that depends on one or more predetermined power consumption characteristics related to transmission of data units over the data lines, and to make the decision based on the power cost. In yet other embodiments, the circuitry is configured to calculate the power cost by calculating a difference between expected amounts of power consumed when transmitting the data unit and an inverse of the data unit, respectively.

In an embodiment, the power consumption characteristics include at least (i) an amount of power consumed in transmitting a given data bit value over a data line and (ii) an amount of power consumed in toggling between data bit values over the data line. In another embodiment, the circuitry is configured to determine the power consumption characteristics during training of the bus. In yet another embodiment, the power cost includes a linear function of variables depending on the first and second counts.

In some embodiments, the circuitry is configured to calculate the power cost by querying a table that is indexed by first and second indices derived from the first and second counts. In other embodiments, the circuitry is configured to predefine a logical rectangle-shaped region including a partial subset of a decision region in the table for which entries in the table correspond to a common polarity and a common inversion decision, and to make the decision by identifying that the first and second indices correspond to a table entry in the predefined region. In yet other embodiments, the circuitry is configured to make the decision only for preselected values of the first count that are more probable than other values of the first count.

In an embodiment, the circuitry is configured to make the decision based on a number of zero-to-one data bit toggles in the data unit and in an inverted version of the data unit, relative to the previously transmitted data unit. In another embodiment, the circuitry is configured to make the decision using a decision function that depends on one or more system parameters that have impact on the power consumption of transmitting the data unit over the bus, and to adapt the decision function upon detecting that one or more of the system parameters have been modified. In yet another embodiment, the one or more system parameters belong to a list including at least: a rate of data transmission over the data lines, a termination impedance at the receiver, a drive strength impedance, parasitic capacitance of the receiver or the data lines, and a level of voltage supply.

In some embodiments, a zero-to-one data bit toggle has a different impact on the power consumption of transmitting the data unit over the bus compared to a one-to-zero data bit toggle, and the circuitry is configured to make the decision based on at least one of a number of zero-to-one data bit toggles and a number of one-to-zero data bit toggles.

There is additionally provided, in accordance with an embodiment that is described herein, a method, including, in an electronic device that includes a bus driver coupled to a parallel bus that includes N data lines, N includes an integer larger than 1, receiving a data unit including N data bits, for transmission over the N data lines. Based at least on the data bits in the data unit, a first count indicative of a number of data bits in the data unit having a predefined value and a second count indicative of a number of the data bits that are inverted relative to corresponding bits in a previously transmitted data unit are determined. Based on both the first and the second counts, a decision is made of whether to invert the data bits in the data unit, depending on whether inversion of the data bits is expected to reduce power consumption of transmitting the data unit over the bus. An output data unit is produced from the data unit by retaining or inverting the N data bits of the data unit based on the decision. The output data unit is transmitted over the data lines via the bus driver.

These and other embodiments will be more fully understood from the following detailed description of the embodiments thereof, taken together with the drawings in which:

BRIEF DESCRIPTION OF THE DRAWINGS

FIGS. 3A-3E are diagrams that schematically illustrate Tables 1-5 depicting cost difference values corresponding to various combinations of '1' bits and bit-toggles for different DC to AC power consumption ratios K, in accordance with embodiments that are described herein;

FIG. 4 is a diagram that schematically illustrates Table 7 that depicts the signs of the cost values, in accordance with an embodiment that is described herein;

FIG. 5 is a diagram that schematically illustrates Table 10 that depicts cost values for equal DC and AC power consumptions, and a decision line for low-complexity polarity-based decision making, in accordance with an embodiment that is described herein.

DETAILED DESCRIPTION OF EMBODIMENTS

Overview

Figure 1:
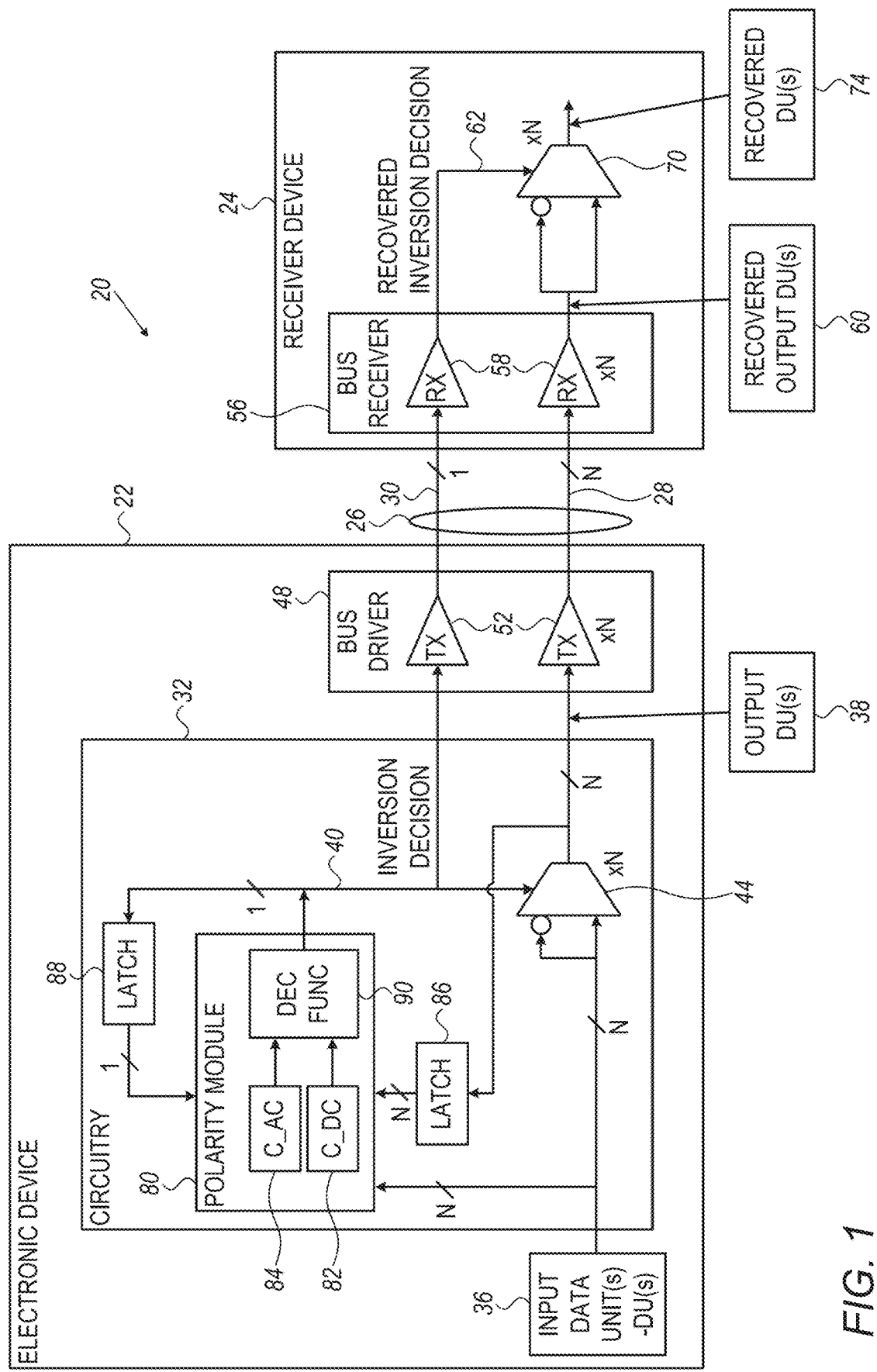
FIG. 1 is a block diagram that schematically illustrates an electronic system that supports improved Data Bus Inversion (DBI) methods, in accordance with an embodiment that is described herein.

Embodiments that are described herein provide improved methods and systems for data bus inversion.

In performing Data Bus Inversion (DBI), a data unit is conditionally inverted for transmission over an I/O interface for reducing I/O power consumption, voltage drops, and power supply noise. The I/O interface or bus is used for transferring data from a transmitter in one electronic device to a receiver in another electronic device.

In some embodiments, a DBI method may be based on checking whether transmitting a data unit consumes higher or lower amounts of power from the power supply, compared to transmitting an inverted version of the data unit. The transmitter typically also transmits a control bit that indicates the polarity of the transmitted data unit to the receiver.

I/O power consumption may be modeled, for example, as partitioned into Direct Current (DC) and Alternate Current (AC) power consumption components. The DC power consumption component is related to an electrical current flowing through a termination resistance at the receiver side and to I/O circuitry leakage. The AC power consumption component is related to charging load capacitance (pad, package, routing trace, receiver input capacitance, and the like), switching in a pre-driver circuitry at the transmitter side. Conventional DC DBI and AC DBI methods are now described.

In the conventional DC DBI method (also referred to as a Static DBI method), a data unit is inverted to reduce power consumption when most of the bits in the data unit are expected to consume termination electrical current. Conventional DC DBI is typically used with asymmetric types of termination, such as a Pseudo Open Drain (POD) termination and a Low Voltage Swing Terminated Logic (LVSTL) termination. An asymmetric termination typically consumes electrical current only (or mainly) in one state of the data signal.

In the conventional AC DBI method, (also referred to as a Dynamic DBI method), a data unit is inverted to reduce power consumption when most of the bits in the data unit are expected to toggle between consecutive transmission unit intervals. The conventional AC DBI method may be used, for example, when power consumption due to parasitic capacitance and/or pre-driver switching is dominant, when the channel is unterminated, or when using a Center-Tap Terminated (CTT) channel.

In principle, the conventional DC DBI method or the conventional AC DBI method could be used alone for controlling power consumption in transferring data over a bus. As will be described in detail below, however, the performance of the disclosed embodiments outperforms that of the conventional DC DBI and AC DBI methods. The limited capability of the DC DBI and of the AC DBI to reduce power consumption is especially noticeable when none of the DC power consumption component and the AC power consumption component is dominant over the other.

In some embodiments, for a Byte data unit, making a data inversion decision based on both DC and AC power consumption components may be implemented using a table that stores all combinations of two Bytes. For N bits, the table size is given by $N^2 \cdot N^2 = N^4$. For example, with a Byte data unit, the number of table entries is 256×256. In considering power consumption only the numbers of '1' and '0' matters, but not their internal order. It can be shown that by considering only unique events of DC consumption and AC consumption, the table for N=8 may be reduced to 9·165=1485 entries. A lookup table for Byte data units that has 9·165 entries, typically requires long latency in making the inversion decision. In the disclosed techniques, as will be described below, a data inversion decision function may be implemented using a lookup table having a much smaller number of entries than 9-165 and short latency in making the inversion decision.

In the description that follows, the term "inversion decision" is also referred to as a "polarity-based decision" and the two terms are used interchangeably.

Consider an electronic device, that includes a bus driver and circuitry. The bus driver is coupled to a parallel bus including N data lines, wherein N includes an integer larger than 1. The circuitry is configured to receive a data unit including N data bits, for transmission over the N data lines, to determine, based at least on the data bits in the data unit: (i) a first count indicative of a number of data bits in the data unit having a specific value, and (ii) a second count indicative of a number of the data bits that are inverted relative to corresponding bits in a previously transmitted data unit. The circuitry is further configured, based on both the first and the second counts, to make a decision of whether to invert the data bits in the data unit, depending on whether inversion of the data bits is expected to reduce power consumption of transmitting the data unit over the bus, to produce an output data unit from the data unit, by retaining or inverting the N data bits of the data unit based on the decision, and to transmit the output data unit over the data lines via the bus driver.

In some embodiments, the bus driver is further coupled to a control line carrying a decision signal indicative of the decision, and the circuitry is configured to make the decision also based on an amount of power consumed due to transmission of the decision signal over the control line.

In some embodiments, making the decision depends on power consumption characteristics of the underlying electronic system. In such embodiments, the circuitry is configured to calculate, based on the first and second counts, a power cost that depends on one or more predetermined power consumption characteristics related to transmission of data units over the data lines, and to make the decision based on the power cost. The circuitry may calculate the power cost, for example, by calculating a difference between expected amounts of power consumed when transmitting the data unit and an inverse of the data unit, respectively.

The power consumption characteristics may include at least (i) an amount of power consumed in transmitting a given data bit value over a data line and (ii) an amount of power consumed in toggling between data bit values over the data line. The circuitry may determine the power consumption characteristics, e.g., during training of the bus.

The circuitry may use any suitable type of a cost function. In an example embodiment, the power cost includes a linear function of variables depending on the first and second counts. The cost function may be implemented using a pre-stored table, and querying the table that is indexed by first and second indices derived from the first and second counts.

In some embodiments, the circuitry predefines a logical rectangle-shaped region including a partial subset of a decision region in the table for which entries in the table correspond to a common polarity and a common inversion decision. The circuitry makes the decision by identifying that the first and second indices correspond to a table entry in the predefined region. For example, using a logical rectangle-shaped region enables making quick inversion decisions without explicitly accessing the table.

In some embodiments, DBI methods that are simpler to implement can also be used. In a first reduced complexity DBI method, the circuitry uses the second count in making the decision only for preselected values of the first count and the second count that are more probable than other values of the first and second counts. In a second reduced complexity DBI method, the inversion decision is based on a number of zero-to-one data bit toggles in the data unit and in an inverted version of the data unit, relative to the previously transmitted data unit, and the data unit is inverted if such inversion reduces the number of zero-to-one toggles.

In the disclosed techniques, an electronic device determines the polarity of a data unit to be transmitted over a bus, based on both DC and AC power consumption components, concurrently. Determining the polarity is based on a cost function that considers both the DC and AC power consumption components in comparing between power consumption with and without inversion of the input data unit. The cost function depends on characteristics of the underlying electronic system and may be adapted when the system is modified. Methods for efficient implementation of a polarity-based decision function using a lookup table are presented. A method for making Low-latency polarity-based decisions using pipeline processing is also disclosed.

System Description

FIG. 1 is a block diagram that schematically illustrates an electronic system 20 that supports improved Data Bus Inversion (DBI) methods, in accordance with an embodiment that is described herein.

In electronic system 20, an electronic device 22 communicates with another device, referred to as a receiver device 24, over an I/O interface or bus 26. Bus 26 includes bus of N data lines 28 for carrying data, and a control line 30 that indicates the polarities of data units being transferred over the bus. Bus 26 typically operates in accordance with a suitable clock signal (not shown).

In the present example, bus 26 includes a parallel bus that carries N data bits concurrently. In alternative embodiments, however, a serial bus can be used, in which case an N-bit data unit is serialized for transmission and de-serialized at the receiver size. Information transmitted via a bus line over time is carried in a corresponding signal (or signals) that is represented by an electromagnetic wave, e.g., an electrical digital or analog signal transmitted over a wired medium, an optical signal, or a signal transmitted over a wireless medium.

Electronic system 20 may be used in any suitable application in which electronic devices communicate with one another over a bus. As a nonlimiting example, electronic system 20 may include a server in which electronic device 22 includes a memory controller and receiver device 24 includes a storage device including one or more nonvolatile memory devices, e.g., Flash devices.

Electronic device 22 includes circuitry 32 that receives N-bit input data units (DUs) 36 and produces respective N-bit output data units 38. An output data unit 38 may include the original input data unit (36) or a bitwise inverted version of the input data unit. A bitwise inverted version of a data unit is also referred to herein as an "inverted data unit" for brevity. The circuitry also outputs a polarity-based decision 40 that indicates the actual polarity of the output data unit, i.e., whether the output data unit includes the input data unit or the inverted input data unit. In some embodiments, the circuitry determines the inversion decision so as to optimize power consumption in transferring data over bus 26, as will be described in detail below.

Circuitry 32 includes a multiplexer 44 that receives both input data unit 36 and the inverted input data unit. Based on polarity decision 40, multiplexer 44 outputs the original data unit or the inverted data unit. A bus driver 48 transmits output data unit 38 and inversion decision 40 over bus 26. Bus driver 48 includes N+1 transmitters 52 for transmitting the N-bit output data unit and the single-bit polarity-based decision over the bus. Each transmitter 52 typically includes a pre-driver and a last-driver (not shown) that consumes power depending on the data polarity (DC), and upon switching the digital signal input to the transmitter between logical '0' and '1' binary values (AC). The DC and AC power consumption of the pre-driver and last-driver are taken into account in a similar manner in making a polarity-based decision.

Receiver device 24 includes a bus receiver 56 coupled to bus 26. Bus receiver 56 includes N+1 receivers 58 that output an N-bit recovered output data unit 60 and a recovered inversion decision 62.

A multiplexer 70 receives recovered output data unit 60, a corresponding inverted recovered output data unit and recovered inversion decision 62 from bus receiver 56, and outputs a recovered data unit 74 depending on the recovered inversion decision. Since both multiplexer 44 at the transmitter side and multiplexer 70 at the receiver device side use the same inversion decision value, recovered data unit 74 equals the original input data unit 36.

As noted above, the overall power consumption that is related to transferring data over bus 26 may be modeled as partitioned into DC and AC power consumption components. The DC component relates to the logical value being transferred during a time unit interval, whereas the AC component relates to transition in logical values between data units transmitted in successive time unit intervals.

Circuitry 32 includes a polarity module 80 that determines polarity-based decision 40 so as to reduce the average power consumption due to both the DC and AC power consumption components. The polarity module includes a DC count 82 denoted C_DC, and an AC count 84 denoted C_AC. The DC count counts the number of bits in the input data having the same binary value. The DC count is indicative, for example, on the number of binary '1' values in the input data unit. The AC count is indicative of the number of bit toggles between an output data unit transmitted in the previous time unit interval and the input data unit received in the present time unit interval.

In some embodiments, the circuitry calculates C_DC, C_AC or both, based on one or more of (i) the input data unit of the present time unit interval (ii) the output data unit of the previous time unit interval that is latched in latch 86, and (iii) the previous inversion decision in the previous time unit interval, which is latched in a 1-bit latch 88. The circuitry then uses C_DC and C_AC to evaluate a power cost function with and without inversion of the input data unit (36).

In some embodiments, polarity module 80 determines polarity-based decision 40 for the present time unit interval, based on at least one of DC count 82, AC count 84 and the previous inversion decision, using a decision function 90 that minimizes the power consumption. As will be described below, in some embodiments, the decision function calculates a cost function that compares between power costs with and without inversion of the input data unit. As will be described below, decision function 90 may be implemented using a lookup table, e.g., stored in a memory (not shown). The lookup table can be implemented using a memory of any suitable type and storage technology, such as, for example, a Read Only Memory (ROM), or writable types of memories such as a Nonvolatile memory such as a Flash memory, a Random Access Memory (RAM), a cache memory, and the like.

Electronic device 22, and in particular circuitry 32, may be implemented in hardware. Alternatively, the electronic device may include a microprocessor that runs suitable software, or a combination of hardware and software elements. In some embodiments, circuitry 32 includes a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration electronic system 20 of FIG. 1 is an example configuration, which is shown purely for the sake of conceptual clarity. Any other suitable electronic system configuration can also be used. Elements that are not necessary for understanding the principles of the present invention, such as various interfaces, addressing circuits, timing and sequencing circuits and debugging circuits, have been omitted from the figure for clarity.

In the example system configuration shown in FIG. 1, electronic device 22 and receiver device 24 are implemented as separate Integrated Circuits (ICs). In alternative embodiments, however, the electronic device and the receiver device may be integrated on separate semiconductor dies in a single Multi-Chip Package (MCP) or System on Chip (SoC), and may be interconnected by an internal bus. Further alternatively, some or all of the electronic device may reside on the same die on which the receiver device is disposed. Further alternatively, some or all of the functionality of electronic device 22 can be implemented in software and carried out by a processor or other element of a host system, or by any other type of electronic device.

In the example of FIG. 1, the bus includes N bits for which a single polarity-based decision is made. In alternative embodiments, however, e.g., for improved efficiency when using large N values, N may be divided into multiple independent subgroups, and the circuitry makes multiple polarity-based decisions for the respective subgroups.

Models of Bus Power Consumption

A physical line of bus 26 may be modeled as a communication channel between a transmitter 52 and a receiver 58. A channel model of this sort typically includes a termination resistance at the receiver side, also referred to as an On-Die Termination (ODT). The purpose of the termination is to improve signal quality at the receiver side. The channel model also includes a parasitic capacitance attributed to pad, package, routing trace, receiver input capacitance, and the like.

In transferring data from electronic device 22 to receiver device 24 over bus 26, power is consumed from the power supply of the electronic device 22. For some termination types, power is consumed also by the ODT at the receiver side. As noted above, the overall power consumption may be partitioned into separate DC and AC power consumption components. The DC component relates to the electrical current flowing through the termination resistance, e.g., when the transmitted signal is at a high voltage level in case of ground termination. When the signal transmitted over a bus line is at a low voltage level, the electrical current through the termination resistance is zero or negligible (in case of ground termination). Part of the DC consumption component that relates to the pre-driver may be caused by level-shifters, voltage generators and/or any other element whose power consumption depends on the polarity of the data unit. The AC component is associated mainly with charging the parasitic capacitance due to transitions of the transmitted signal from a low voltage level to a high voltage level, between consecutive time unit intervals. Part of the AC consumption component that relates to the pre-driver may represent switching in a digital circuit that controls the transmitter operation.

The DC consumption component per one data line associated with termination may be modeled quantitively based on the average electrical current flowing through the termination resistance, given by:

$$Idc=[Vdd/(Ron+Rdot)] \cdot SigProb \qquad \text{Equation 1}$$

In Equation 1, VDD denotes the voltage level provided by the power supply of electronic device 22, Ron denotes the output serial resistance of the transmitter (52), Rdot denotes the termination resistance at the receiver, and SigProb denotes the probability of the transmitted signal having a high voltage level (in case of ground termination).

The AC component relates to charging the parasitic capacitance by electrical current originating from the power supply. When the capacitance is discharged, electrical current flows to ground potential and is not consumed from the power supply.

The AC component per one data line associated with capacitances connected to the channel may be modeled quantitively as:

$$Iac=Ctot \cdot Vswing \cdot DataFreq \cdot TR \qquad \text{Equation 2}$$

In Equation 2, Ctot denotes the overall parasitic capacitance, Vswing denotes the voltage difference at the receiver input, between transmitting high and low voltage levels (Vswing may depend on the type of termination used), DataFreq denotes the frequency of the data signal, and ToggleRate (TR) denotes the average transition rate of the transmitted signal between consecutive time intervals. For a random signal, TR=0.5.

The quantitative models in Equations 1 and 2 are simplified models that may not include all power consumption sources. For example, power consumed by the pre-driver of the transmitter is omitted form Equations 1 and 2 but will be considered for improved DBI further below. Other effects omitted from Equations 1 and 2 are Overshoot (OS) and Undershoot (US) effects, and effects caused by signal reflection, which are typically smaller than other power consumption sources. OS and US events may occur due to impedance discontinuity and crosstalk in the channel. In such events the voltage levels in some locations of the channel may differ from the expected voltage levels. Also, at high data rates, all or some of the parasitic capacitances may not be fully charged within a unit interval time. Therefore, the calculation in Equation 2 may result in over-estimation of the AC power consumption component.

Improved DBI Methods that Consider Both DC and AC Power Consumption Components Concurrently Conventional DC DBI and AC methods are designed to reduce power consumption based on one of the DC and AC components, respectively. Such methods that are considering only one of the DC and AC power consumption types are inferior to the disclosed techniques in which both the DC and AC components are considered concurrently.

Assume, for example, that the data unit transferred over bus 26 includes Byte unit (N=8 in FIG. 1), i.e., the bus transfers eight bits per a time unit interval. In the conventional DC DBI method, the average power consumption may be reduced by applying a logical bitwise inversion operation to Bytes that contain more than four '1' bits (in case of ground termination). In the conventional AC DBI method, power consumption may be reduced by transmitted an inverted Byte when the number of bit-transitions in the Byte to be transmitted in the present time unit interval relative to the Byte transmitted in the previous time unit interval is lower than four. In some disclosed DBI embodiments, AC power consumption is associated with both zero-to-one and one-to-zero bit-transitions, wherein in other disclosed DBI embodiments AC power consumption is associated with only zero-to-one bit transition as will be described below.

Figure 2:
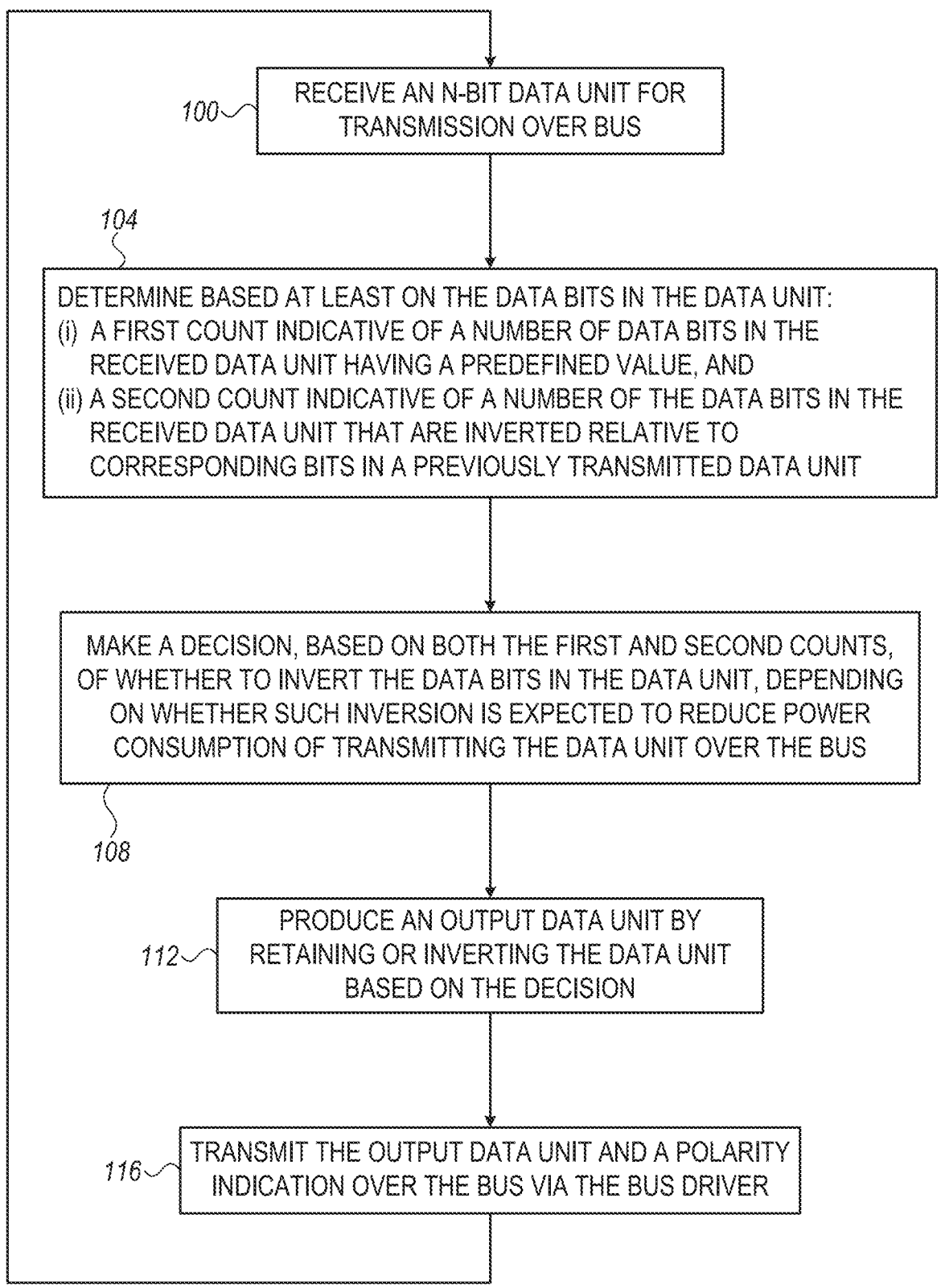
FIG. 2 is a flow chart that schematically illustrates an improved DBI method that considers both DC and AC power consumption components concurrently, in accordance with an embodiment that is described herein.

FIG. 2 is a flow chart that schematically illustrates an improved DBI method that considers both DC and AC power consumption components concurrently, in accordance with an embodiment that is described herein.

The method will be described as executed by circuitry 32 of electronic device 22 in FIG. 1.

The method begins with circuitry 32 receiving an N-bit input data unit 36 to be transmitted over bus 26, at a data reception stage 100. At a counting stage 104, the circuitry determines (i) a first count indicative of the number of data bits in the received data unit having a predefined logical value (e.g., a logical '1' value (in case of ground termination), and (ii) a second count indicative of the number of the data bits in the received data unit that are inverted relative to corresponding bits in the data unit transmitted in the previous time unit interval. The first and second counts in the present method may implement C_DC 82 and C_AC 84 of FIG. 1 above.

At a decision-making stage 108, the circuitry uses both the first and second counts to determine polarity-based decision 40. A polarity-based decision function 90 makes a decision of whether or not to invert the bits in the data unit, depending on whether such inversion is expected to reduce power consumption of transmitting the data unit over the bus. Example embodiments for implementing decision function 90 will be described in detail below.

At a decision application stage 112, the circuitry produces an output data unit (e.g., using multiplexer 44) by retaining or inverting the data unit received at stage 100, based on the decision made at stage 108. At a transmission stage 116, the circuitry transmits the output data unit and corresponding inversion decision 40 over bus 26 via bus driver 48. Following stage 116, the method loops back to stage 100 to receive a subsequent data unit for transmission.

Inversion Decision Functions for Improved DBI

In some embodiments, circuitry 32 decides on the polarity of the output data unit using a decision function (e.g., decision function 90 in FIG. 1) that considers both DC and AC components of the power consumption, concurrently. Example such decision functions are described below.

Let Pdc1 and Pdc0 denote the DC power consumption levels while the signal transmitted is at high and low voltage levels, respectively. In the description that follows, the termination at the receiver side is mainly assumed to be of the LVSTL type. Alternatively, other suitable types of termination can also be used. In this case, Pdc0 is zero or negligible and therefore may be omitted.

In general, in addition to the ODT power consumption (e.g., in Equation 1), Pdc1 and Pdc0 also represent pre-driver DC consumption and other power consumption factors that depend on the data polarity. Since the inversion decision is based on the difference in power consumption between the two different polarities, the difference Pdc=Pdc1−Pdc0 may be used in making the inversion decision, as will be described with reference to Equation 3 below. Note that in case of using a CTT termination, similar amounts of power are consumed (by the ODT as described in Equation 1) in transmitting high and low voltage levels, in which case the DC power consumption would be Pdc1=Pdc0, in which case Pdc=0.

Further let the AC power consumption components Pac1 and Pac0 denote the amounts of power consummated due to zero-to-one and one-to-zero transitions between output data units in successive time unit intervals, respectively. Pac refers to the power required to charge the parasitic capacitance, as well as the power consumed by the pre-driver of transmitter 52. Pac0 refers only to power consumption of the pre-driver because no power is consumed from the power supply while the parasitic capacitance is being discharged, as noted above. Unlike using the difference Pdc=Pdc1−Pdc0, in the AC case, Pac1 and Pac0 cannot be replaced with the difference Pac1−Pac0, as will be shown with reference to Equation 3 below.

In some embodiments, decision function 90 is implemented using a cost function that compares between power costs with and without inversion of the input data unit. For example, the cost function calculates a cost value as the power consumption when the data unit is inverted, minus the power consumption when the data unit is not inverted. With a cost function of this sort, a positive cost value means that inverting the input data unit increases the power consumption whereas a negative cost value means that inverting the input data for transmission results in decreasing the power consumption.

Let the symbol X denote the number of '1' bits in the output data unit, and let the symbol T denote the number of toggles (bit differences) between the current output data unit and the output data unit transmitted in the previous time unit interval. X and T are respectively correspond to the DC and AC components of power consumption. For a Byte data unit, both X and T get values in the range 0 ... 8.

Consider a case in which Pac0=Pac1=Pac, Pdc0=0, and Pdc1=Pdc=Pac. Under this assumption, the AC consumption component is divided equally between zero-to-one and one-to-zero toggles. This approximation is used only in this example and is not used in other disclosed embodiments.

Moreover, under the above assumption the DC consumption component is caused only due to ODT when the data polarity is positive. Under the above assumptions, the DC and AC components incur equal normalized units of power consumption per a physical bus line. Let P denote a power consumption unit. If X=0 and T=0, the power consumption with no inversion of the input data unit equals 0 power units (zero '1's and zero toggles: 0·Pdc+0·Pac=0·P). On the other hand, with inversion of the input data unit, the power consumption equals 16 power units (eight '1s'+eight toggles: 8·Pdc+8·Pdc=16·P). The cost difference value is therefore given by 16·P−0·P=16·P. Similarly, when X=8 and T=8, the power consumption with no inversion is 16 power units (eight '1's plus eight toggles), and with inversion the power consumption equals 0 power units (zero '1's and zero toggles). In this example, the cost difference value is 0·P−16·P=(−16)·P. In the tables described below, the P factor is assumed to equal unity and is therefore omitted.

FIGS. 3A-3E are diagrams that schematically illustrate Tables 1-5 depicting cost difference values corresponding to various combinations of '1' bits and bit-toggles for different DC to AC power consumption ratios K=Pdc/Pac, in accordance with embodiments that are described herein.

Tables 1-5 (as well as Tables 7 and 9 that will be described further below) represent a logical two-dimensional (2D) array, in which each entry is accessed using two indices, e.g., X and T. Each of Tables 1-5, 7 and 9 may be physically stored in memory in a 2D memory array, in a linear memory address space, or using any other physical organization in memory.

Table 1 in FIG. 3A depicts cost difference values (normalized by P) corresponding to various combinations of X and T in the range 0 ... 8 when K=Pdc/Pac=1. As explained above, negative cost values indicate that inversion of the data unit results in reduced power consumption, whereas positive cost values indicate that inverting the input data results in increased power consumption.

In Table 1, a diagonal line separates between non-negative and negative cost difference values. For combinations of X and T below the diagonal line, the polarity-based decision should be to invert the input data unit because such inversion results in a lower power consumption compared to not inverting the input data unit.

In Table 1, a horizontal dotted line separates between X values in the ranges X=0 ... 4 and X=5 ... 8. This horizontal dotted line represents a decision line of a conventional DC DBI, which is based only on DC power consumption. It should be noted that the horizontal dotted line does not fully separate between negative and non-negative cost values, and therefore the conventional DC DBI method is inferior to the improved DBI method that decides on the polarity based on both the DC and AC power consumption components.

In Table 1, a vertical dotted line separates between T values in the ranges T=0 ... 4 and T=5 ... 8. This vertical dotted line represents a decision line of a conventional AC DBI, which is based only on AC power consumption. It should be noted that the vertical dotted line does not fully separate between negative and non-negative cost values, and therefore the conventional AC DBI method is inferior to the improved DBI method that decides on the polarity based on both the DC and AC power consumption components.

Decision function 90 may be implemented based on Table 1 (or another table of this sort). In such an embodiment, the cost values are pre-stored in a memory of circuitry 32 (not shown). At run time, the circuitry determines the indices X and T (e.g., using C_DC 82 and C_AC 84) and accesses the pre-stored table using X and T to retrieve the corresponding cost value. Polarity module 80 then determines polarity 40 based on the sign of the relevant cost value. In some embodiments, instead of storing the cost values in the table, the circuitry stores in the table only the signs of these cost values, which reduces the storage space required for the table.

In Tables 1-5, a left-upper quadrant (in which all the cost values are non-negative) and a right-lower quadrant (in which all the cost values are negative) are depicted in gray color. In the present example, the quadrants are bordered using the horizontal and vertical dotted lines described above. In alternative embodiments, however, other rectangle-shaped regions of all non-negative and all negative cost values can also be used.

In the left-upper quadrant of Table 1 all cost values are non-negative, and therefore for pairs of X and T values in this quadrant the input data unit should not be inverted, in an embodiment. In the right-lower quadrant all cost values are negative, and therefore for pairs of X and T values in this quadrant the input data unit should be inverted, in an embodiment.

In some embodiments, the circuitry predefines an all-non-negative rectangle-shaped region and an all-negative rectangle-shaped region in Table 1. (e.g., the quadrants described above) The circuitry checks whether X and T belong to one of these regions, and if so, makes a quick inversion decision, e.g., without the need to check whether the X and T indices correspond to a table entry below or above the diagonal. In such embodiments, since making the decision is carried out without explicitly accessing the table, Table 1 may exclude entries belonging to the all-non-negative region and to the all-negative regions, which reduces the storage space required for Table 1. The predefined region has a logical rectangle shape in the two-dimensional table, regardless of how the table entries are arranged in memory. The predefined region includes a partial subset of a decision region in the table for which all entries correspond to a common polarity and a common decision.

In the example of Table 1 above, a system in which Pdc=Pac was assumed. In other system configurations, a positive-valued ratio denoted K for which Pdc=K·Pac may be used. In the example of Table 1, K=1. Tables 2-5 of respective FIGS. 3B-3E, cost values corresponding ratios K=4, K=2, K=0.5 and K=0.25 are depicted, respectively. Alternatively, other suitable K ratios can also be used. The K ratio represents a power consumption characteristic of the underlying electronic system.

Each of Tables 2-5 in respective FIGS. 3B ... 3E, has a structure similar to that of Table 1 of FIG. 3A above, depicting DC and AC dotted decision lines of conventional DC and AC DBI methods, and gray-color quadrants. The cost values, however, differ among the various tables. Table1 ... Table5 include different respective decision diagonal lines separating between non-negative and negative cost values. In some embodiments, decision function 90 is implemented using a table such as Tables 1-5, preconfigured with cost values or with signs of the cost values corresponding to the underlying K ratio.

In Table 2 of FIG. 3B. for which K=4, since the DC component is significantly dominant over the AC component, the diagonal decision line is relatively close to the horizontal dotted line of the conventional DC DBI method.

In Table 5 of FIG. 3E for which K=0.25, the AC component is significantly dominant over the DC component, and therefore the diagonal line is relatively close to the vertical dotted line of the AC DBI method.

It should be noted that the all-non-negative and all-negative quadrants in gray color are common to all K values. This means that the same table structure may be used for various electronic systems characterized by different respective K ratios.

High-Accuracy Cost Functions

In the cost functions presented above, e.g., using example tables such as Tables 1-5, the power consumed by the polarity-based decision bit has been omitted. Moreover, the same AC power consumption was assumed for both zero-to-one (Pac1) and one-to-zero (Pac0) bit-toggles. In addition, pre-driver power consumption has been ignored. Accurate cost functions that address these issues are now described. Although the accurate cost functions will be described for a Byte data unit, other suitable data units can be used in a similar manner.

In specifying the cost functions, the following definitions will be used:

X—The number of bits having a logical '1' value in the input Byte (0 . . . 8).
Y—The number of zero-to-one bit-transitions between previous output Byte and current input Byte (0 . . . 8).
Z—The number of one-to-zero bit-transitions between previous output Byte and current input Byte (0 . . . 8).
T—$T=Y+Z-T$ denotes the total number of bit-transitions between previous output Byte and current input Byte.
D—The state of the inversion decision in the preceding time unit interval (0/1). The cost function considers both the level and toggle of the inversion decision bit.
Pdc1—The DC power consumed while transmitting a '1' value. Pdc1 includes the power consumed by the ODT in case of ground termination, as well as pre-driver DC consumption and other elements whose power consumption depends on the polarity of the bits in data unit.
Pdc0—The DC power consumed while transmitting a '0' value. Pdc0 includes the power consumed by the ODT in case of a POD termination, as well as pre-driver DC consumption and other elements whose power consumption depends on the polarity of the bits in data unit.
Pac1—Power consumption in a zero-to-one bit-transition. Pac includes the power consumed due to charging parasitic capacitances connected to the channel, as well as power consumption of the pre-driver and other elements whose power consumption is related to zero-to-one toggles.
Pac0—Power consumption in a one-to-zero bit-transition. Pac0 includes the pre-driver and other elements whose power consumption is related to one-to-zero toggles.

Table 6 depicts cost values of DC and AC power consumption components with inverting the input Byte (right column) and without inverting the input Byte (left column).

TABLE 6

Cost values without and with Byte inversion

| | Cost with no inversion | Cost with inversion |
|---|---|---|
| DC consumption difference | X · Pdc | (8-X) · Pdc |
| AC consumption due to zero-to-one toggles | Y · Pac1 | (8-Z-X) · Pac1 |
| AC consumption due to one-to-zero toggles | Z · Pac0 | (X-Y) · Pac0 |
| Power consumption due to transmission of the inversion decision bit | D · Pac0 | Pdc + (1-D) · Pac1 |

Based on Table 6, it can be shown that a cost function that calculates the power consumption difference between the cost of not-inverting and the cost of inverting a Byte data unit is given by:

$$\text{CostPowerDiff} = X \cdot (2Pdc - Pac0 + Pac) + (T+D) \cdot (Pac0 + Pac1) - 9 \cdot (Pdc + Pac1) \quad \text{Equation 3}$$

A DBI method in which the decision function is based on the power difference function of Equation 3 (or equivalent to that of Equation 3) is referred to herein as an "improved DBI method."

The power difference function in Equation 3 is a linear function of the variables X and (T+D). This function depends on the following coefficients: (i) a coefficient of variable X given by (2Pdc−Pac0+Pac1), (ii) a coefficient of (T+D) given by (Pac0+Pac1), and (iii) a free coefficient given by $[-9 \cdot (Pdc+Pac1)]$. The above coefficients depend on the characteristics of the underlying electronic system. For a given system, these coefficients may be assumed to be constant, and may be predetermined or learned at run time, in an embodiment.

In Equation 3, negative power difference values indicate that power consumption is lower when not inverting the input data unit, whereas positive cost values indicate that the power consumption is lower when inverting the data unit.

FIG. 4 is a diagram that schematically illustrates Table 7 that depicts the signs of the cost values, in accordance with an embodiment that is described herein. The values in Table 7 are based on Equation 3 and correspond to X values in the range 0 . . . 8 and to (T+D) values in the range 0 . . . 9. The cost values calculated for producing Table 7 are determined for an example system in which Pdc/(Pac0+Pac1)=1 and Pac1/Pac0=3. In some embodiments, the indices X and (T+D) may be derived based on counts C_DC 82, C_AC 84 and on the previous decision at the output of latch 88 of FIG. 1.

In Table 7 of FIG. 4, negative-signed entries indicate a decision not to invert the input data unit, whereas positive-sign entries indicate a decision to invert the input data unit. The upper-left quadrant may serve for fast decision of not to invert the input data unit. The lower-right quadrant may serve for fast decision to invert the input data unit. As described above, other suitable (logical) rectangle-shaped regions of all-negative and all-positive (or all-non-negative) values can also be used for fast decision.

Assuming Pdc0=0, a variant of the power difference cost function in Equation 3 is given by:

$$\text{CostPowerDiff} = (Pdc1 - Pac0) \cdot (2X - 9) + (Pac1 + Pac0) \cdot (X+T+D-9) = Pdc1 \cdot (2X-9) + Pac1 \cdot (X+T+D-9) + Pac0 \cdot (T+D-X)) \quad \text{Equation 4}$$

For positive power difference values produced by Equation 4, the input data unit should be inverted.

In some embodiments, the power difference function in Equation 4 may be simplified by omitting explicit usage of the previous decision D. In such embodiments, D may be replaced with a signal probability factor, e.g., ~0.4, assuming a random data stream. The resulting approximate cost function assuming a probability factor of 0.4 is given by:

$$\text{Approximated CostPowerDiff} = Pdc1 \cdot (2X-9) + Pac1 \cdot (X+T-8.6) + Pac0 \cdot (T-X+0.4)) \quad \text{Equation 5}$$

The power difference function in Equation 4 can be further presented in the form:

$$\text{NormalizedCostPowerDiff} = R \cdot (2X-9) + (X+T+D-9) \quad \text{Equation 6}$$

wherein R is a parameter representing the characteristics of the underlying electronic system, given by:

$$R = (Pdc1 - Pac0)/(Pac1 + Pac0) \quad \text{Equation 7}$$

The cost function in Equation 6 may also be approximated by replacing D with the factor ~0.4.

Implementation Considerations

In some embodiments, decision function 90 may be implemented by calculating power difference values using one of the functions in Equations 3-6 above. In some embodiments, the circuitry pre-stores the coefficients used in the selected Equation. At run time, the circuitry determines actual values of the variables used in the selected Equation (e.g., based on C_DC 82, C_AC 84 and the decision in the previous time unit interval), and calculates the value corresponding to the actual variables. The polarity module (80) then decides on the data inversion based on the sign of the power difference value.

Direct calculation of the power difference functions in Equations 3-6 may incur a long latency. In some embodiments in which low latency is important, the function may be implemented using a lookup table that pre-stores the power difference values or only the polarities of the power difference values. Indices for accessing the lookup table at run time may be derived from counts C_DC 82, C_AC 84 and the decision in the previous time unit interval.

The lookup table may be implemented in various ways. For example, a full table such as Table1 . . . Table5 includes 81 entries. By omitting the entries in the gray color quadrants (that are used for fast decision), the number of entries reduces to only 40 entries (81−25−16=40). Similarly, a table for a power difference function that considers the previous decision value D such as Table 6 includes 90 entries, which reduces to 45 entries by omitting the entries in the gray color quadrants. In some embodiments, to further reduce storage space for the lookup table, only a bit per entry is stored, wherein the bit value indicates the polarity of consumption difference.

As noted above, the power difference functions used for deciding on data inversion depend on characteristics of the underlying electronic system. These system characteristics include power consumption parameters such as Pdc1, Pdc0, Pac and Pac0 and/or derived from these power consumption parameters. Other system characteristics may include the operation frequency of the bus, the type and resistance of the termination used at the receiver side, and the parasitic capacitance of the data lines. In some embodiments, the system characteristics are determined beforehand and used for calculating the power difference values used for producing the lookup table. Alternatively, circuitry 32 estimates the system characteristics at run time, e.g., during bus training of bus 26.

In some embodiments, electronic device 22 supports multiple different receiver devices that may be produced by different vendors. Electronic systems (such as system 20) that may be coupled via bus 26 to different receiver devices, may differ in system characteristics as described above. In some embodiments, electronic device 22 learns at least part of the system characteristics automatically. In some embodiments, electronic device 22 (or some processor in a computer in which the electronic device resides) detects that the receiver device has been modified, and performs bus training for updating the system characteristics used by electronic device 22 for the power difference function or lookup table. This updating feature is useful, for example, when receiver device 24 is upgraded or replaced with a different one.

In some embodiments, circuitry 32 pre-stores multiple different sets of system characteristics and/or multiple lookup tables and selects the relevant set of system characteristics or lookup table at runtime.

It should be noted that in conventional DBI methods the data inversion decision is based on a total number of bit toggles. Unlike the conventional methods, in the disclosed embodiments zero-to-one toggles and one-to-zero toggles are considered separately, because a zero-to-one data bit toggle may have a different impact on the power consumption of transmitting data units over the bus compared to a one-to-zero data bit toggle. Therefore, in some embodiments, the circuitry makes the inversion decision based on at least one of a number of zero-to-one data bit toggles and a number of one-to-zero data bit toggles. The most efficient DBI decision is based on the total number of bit toggles, because coefficients of both toggle types are identical, as shown in Equation 3 above.

A Low-Latency DBI Implementation

A method for accessing the lookup table of power difference values or polarity-based decisions using a low-latency pipeline will be now described. In some embodiments, when a data unit (e.g., a Byte) is received for transmission over bus 26, the polarity of the previous output data unit (e.g., D in Equation 4) is not yet available. In some embodiments, Bytes received for transmission over the bus are processed in a pipelined manner as depicted, for example, in Table 8.

TABLE 8

Pipeline processing of data units

| Time | T1 | T2 | T3 | T4 | T5 |
|---|---|---|---|---|---|
| Data Byte | A | B | C | D | E |
| Data Tx | | | A | B | C |
| | Calc X Y +Z 9-Y-Z | Access table, Fetch next decision | Transmit A and inversion decision | | |
| | | Calc X Y + Z 9-Y-Z | Access table, Fetch next decision | Transmit B and inversion decision | |
| | | | Calc X Y + Z 9-Y-Z | Access table, Fetch next decision | Transmit C and inversion decision |

The columns in Table 8 correspond to consecutive time intervals denoted T1 . . . T5, during which Bytes denoted A . . . E are respectively received.

At T1, Byte A is received, and circuitry 32 calculates the variable X based on A. Since at this point the previous decision is unknown, the circuitry speculatively calculates both (Y+Z) for a previous decision D=0 and (9−Y−Z) for a previous decision D=1, based on counting the total number of transitions between A and a previously received data unit (or based on an initial state of the channel, assuming that the channel has been quiet).

At T2, Byte B is received, and the previous decision becomes available. The circuitry accesses the lookup table using X and one of (Y+Z) or (9−Y−Z) depending on whether the previous decision respectively equals '0' or '1'. Based on the inversion decision indicated by the lookup table, the circuitry retains or inverts the input data unit to produce the output data unit. Further at T2, the circuitry fetches the next decision, and calculates the variables X, (Y+Z) and (9−Y−Z) to be used for accessing the lookup table for determining the output polarity for Byte B at T3. At T3, the circuitry outputs the Byte A or the inverted Byte A along with the decision determined for Byte A at T2. As shown, Byte A is received at T1 but transmitted at T3, i.e., a latency of two unit intervals. The pipeline operation is applied similarly to Bytes B, C and other subsequent Bytes.

It should be noted that the calculation of the variables X, (Y+Z) and (9−Y−Z) requires no knowledge of the previous decision. As such, in an embodiment, the calculation of these parameters may be carried out in an earlier time unit interval, thus reducing the latency to a single unit interval.

The pipeline scheme in Table 8 is designed for making polarity-based decisions at high data rates. For low datarates in which the latency in calculating indices and accessing the lookup table using these indices is shorter than a single unit interval, the speculative calculation in Table 8 may be omitted.

Reduced Complexity DBI Methods

In some of the embodiments that were described above, the decision function (e.g., based on the cost function in Equation 3) considers both DC and AC power consumption components, which results in improved (e.g., minimal) power consumption performance, compared to conventional DC DBI and AC DBI methods. The decision function may be implemented using a lookup table in which a diagonal line separates between a region in the table for which circuitry 32 retains the input data unit non-inverted and another region in the table for which the circuitry inverts the input data unit. Decision functions having reduced complexity are now described.

It is noted that the indices used for accessing a lookup table such as Table 1 are distributed (in a random data stream) in accordance with a binomial distribution.

For example, for a Byte data unit the probabilities of having $X=0 \ldots 8$ '1's out of the eight bits in the index is given in Table 9.

TABLE 9

| A binomial distribution for a Byte | | | | | |
| --- | --- | --- | --- | --- | --- |
| X '1' s | 0 and 8 | 1 and 7 | 2 and 6 | 3 and 5 | 4 |
| Prob | 0.0039 | 0.0313 | 0.1094 | 0.2188 | 0.2734 |

As seen in Table 9, in the binomial distribution, the central value (X=4 for a Byte) is the most probable value and the probability reduces for X values further below or above the central value. This means that entries close to the center of the lookup table (e.g., Table 1) are more probable than entries residing remotely from the table center. Consequently, power consumption is mainly determined by indices corresponding to entries close to the center of the table.

In a first reduced complexity decision function, that is relevant for systems with a DC consumption component higher than the AC consumption component, decision a line is defined to make inversion decisions that reduce power consumption in a majority of cases, basing on statistical distribution of the data units.

FIG. 5 is a diagram that schematically illustrates Table 10 that depicts cost values for equal DC and AC power consumptions, and a decision line for low-complexity polarity-based decision making, in accordance with an embodiment that is described herein. Embodiments for making polarity-based decisions with reduced complexity may be based, in an example embodiment, on Table 10, which is similar to Table 1 above, but uses a different decision rule.

In the example of Table 10, instead of using a full diagonal decision line as in Table 1 above, only part of the diagonal line corresponding to a central region of the X and T indices in the range 3-5 is preserved. A decision function based on the decision line of Table 10 is simpler to implement than a decision function that is based on a full diagonal, e.g., of Table 1. A decision function based on the decision line of Table 10 provides power consumption performance close to optimal, because for vast majority of scenarios those decision lines are identical.

In a second reduced complexity approach, that is relevant for systems with an AC power consumption component higher than the DC power component, a decision line is defined to make decisions that reduce power consumption for a majority of scenarios (similarly to the first reduced complexity approach). Let X denote the number of '1's in the input data unit and let Y and Z denote the respective numbers of zero-to-one and one-to-zero bit-transitions between the input data unit and the output data unit transmitted in the previous unit interval. When the underlying data unit is a Byte, the number of zero-to-one transitions in the inverted Byte is given by (8-X-Z). In systems in which the AC consumption is dominant, a decision rule that results in reducing the power consumption is given by:

$$\text{Invert input Byte if } (8-X-Z)<Y \qquad \text{Equation 8}$$

Note that the decision rule in Equation 8 does not require explicit knowledge of the power consumption parameters of the underlying system.

Adaptive DBI Methods

In some embodiments, the circuitry makes the inversion decision using a decision function (e.g., based on the cost difference function of Equation 3 above) that depends on one or more system parameters that have impact on the power consumption of transmitting data units over the bus. In such embodiments, the circuitry may adapt the decision function, upon detecting that one or more of the system parameters have been modified. The system parameters belong to a list including at least: a rate of data transmission over the data lines, a termination impedance at the receiver, a drive strength impedance, parasitic capacitance of the receiver and/or the data lines, and the level of voltage supply.

Performance Evaluation of Various DBI Methods

FIGS. 6A-6D are graphs that schematically illustrate power consumption performance of various DBI methods, in accordance with embodiments that are described herein.

The graphs in the figures correspond to the DBI methods listed herein:

Static DBI—the conventional DC DBI method.
Dynamic DBI—the conventional AC DBI method.
Adaptive DBI—the disclosed improved DBI method with inversion decisions based on Equation 3 above.
Enhanced DC DBI—The first reduced complexity DBI method described above.
Enhanced AC DBI—the second reduced complexity DBI method described above.

Figure 6A:
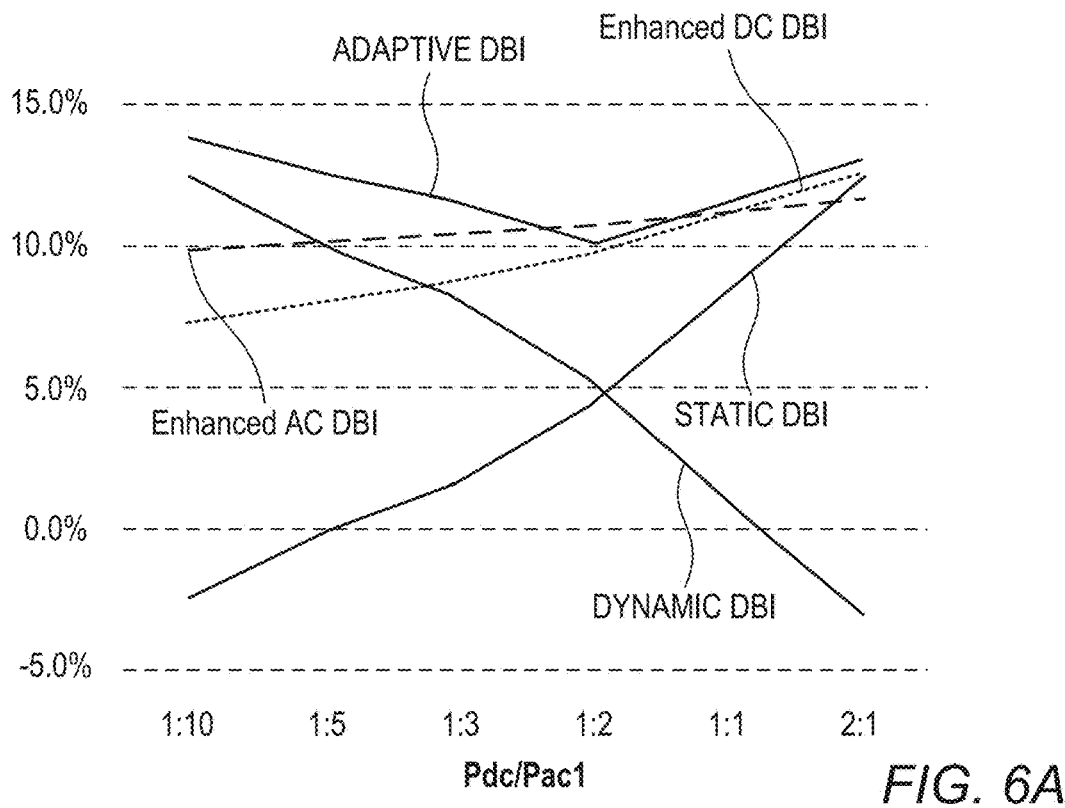
FIGS. 6A-6D are graphs that schematically illustrate power consumption performance of various DBI methods, in accordance with embodiments that are described herein.
Figure 6B:
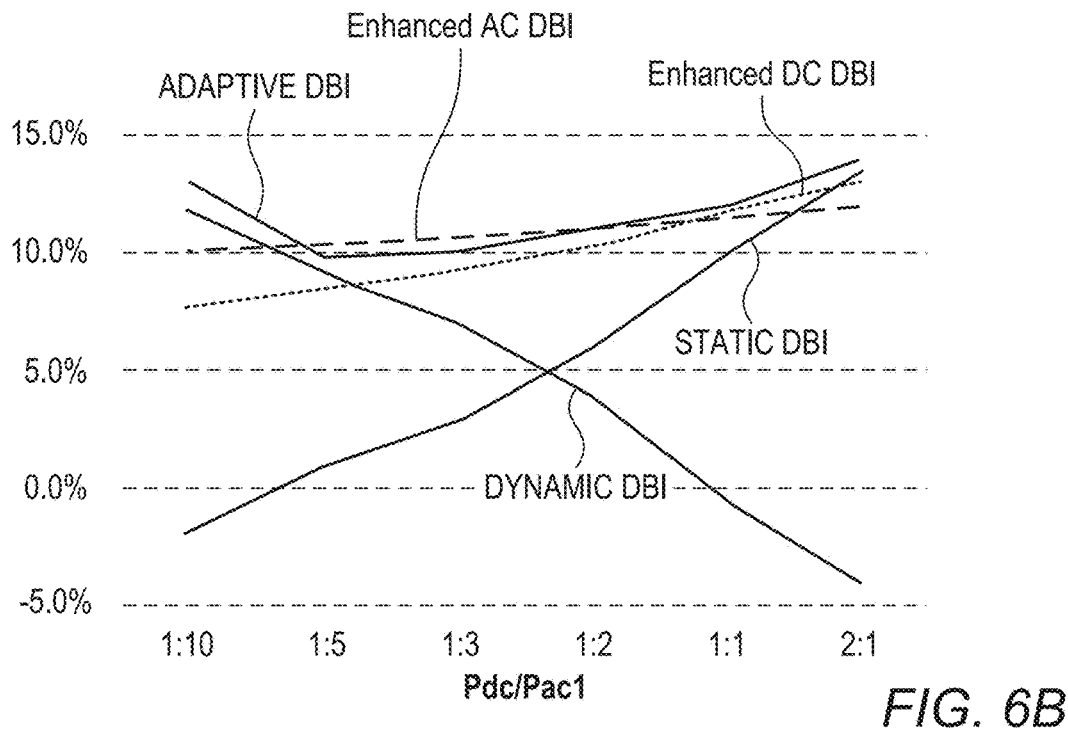

FIGS. 6A and 6B depict graphs of average power consumption saving for transferring over the bus random data units (Bytes), for various ratios of Pdc/Pac1 in the range 1:10 to 2:1. In FIGS. 6A and 6B the ratio Pac0/Pac1 equals 0.5 and 0.2, respectively. In the graph of the adaptive DBI method, the inversion decisions are taken by circuitry 32 using Equation 3 above.

Figure 6C:
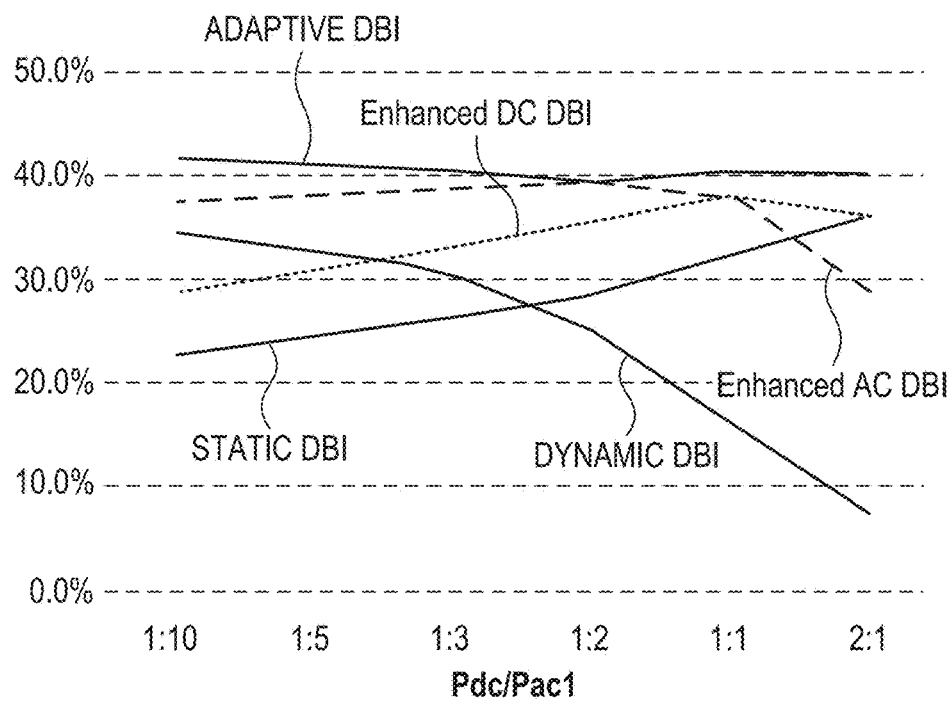
Figure 6D:
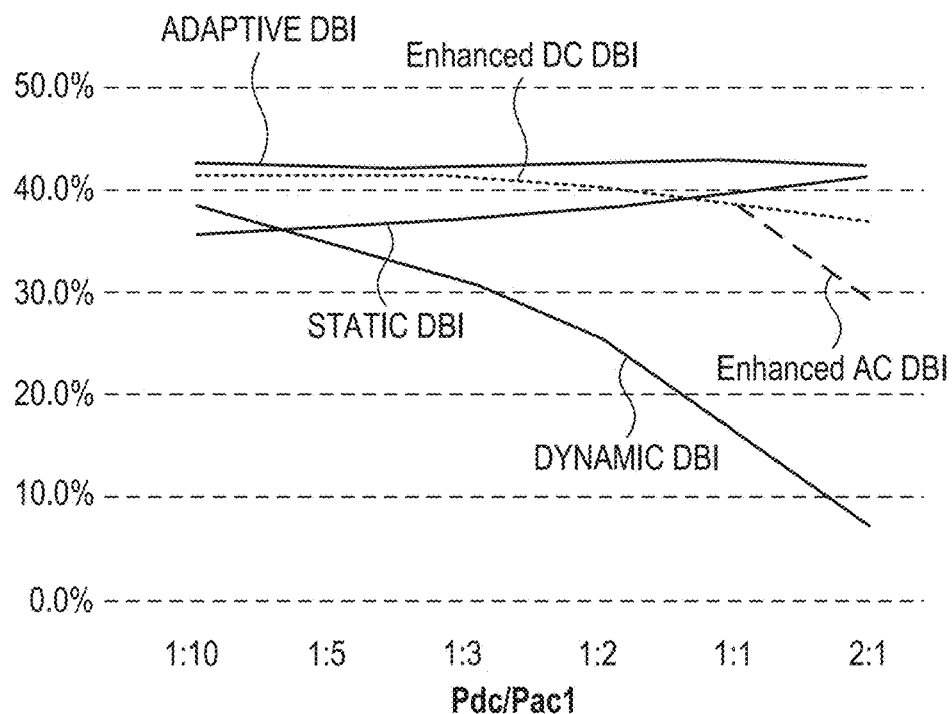

FIGS. 6C and 6D depict graphs of peak power consumption saving for transferring over the bus random data units (Bytes), for various ratios of Pdc/Pac1 in the range 1:10 to 2:1. The test includes power consumption of two clock signals of a differential pair. The power consumed by the clock signals is not affected by the underlying DBI method applied. In FIGS. 6A and 6D the ratio Pac0/Pac1 equals 0.5 and 0.2, respectively. In the graph of the adaptive DBI method, the inversion decisions are made by polarity module 80 of circuitry 32, using the cost function of Equation 3 above.

As seen in FIGS. 6A-6D, the improved DBI method outperforms the other DBI methods for most system conditions. Moreover, the performance of the improved DBI method is much less sensitive to the system characteristics compared to the alternative DBI methods.

As can also be seen in FIGS. 6A-6D, the power-saving performance of the improved DBI method is expected to be better than the other DBI methods when the ratio Pdc/Pac1 is close to unity, i.e., when none of the DC and AC component of the power consumption is dominant over the other.

When no DBI method is used (all Bytes are not inverted), peak power is consumed when transmitting an all-zero Byte followed by an all-ones Byte. When applying the improved DBI method, peak power is consumed when transmitting an all-zero Byte followed by a Byte having four '1's and four '0's. It can be shown that when Pac1 approximately equals 4·Pac0, the ratio between the peak power consumption using the improved DBI method, divided by the peak power consumption with no DBI method is about 58%. This indicates a theoretical improvement of about 42% by using the disclosed improved DBI method (based, e.g., on Equation 3, 4, 5 or 6). The peak power consumption is also based on the system parameters mentioned above: the ratio Pac0/Pac1 equals 0.5 and 0.2, and the ratio Pdc/Pac1 is in the range 1:10 to 2:1.

The embodiments described above are given by way of example, and other suitable embodiments can also be used. For example, although in the embodiments above the underlying data unit was mainly assumed to be an 8-bit data unit (Byte), other suitable data units having a number of bits different than eight are similarly applicable.

The embodiments described above are given by way of example, and other suitable embodiments can also be used. For example, the embodiments described above are applicable in various bus types, e.g., any parallel interface with Pulse Amplitude Modulation (PAM)-2 (PAM2) signaling.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic device, comprising:
a bus driver coupled to a parallel bus comprising N data lines, wherein N comprises an integer larger than 1; and
circuitry, configured to:
receive a data unit comprising N data bits, for transmission over the N data lines;
determine, based at least on the data bits in the data unit, (i) a first count indicative of a number of data bits in the data unit having a predefined value, wherein values of the first count are distributed in accordance with a given statistical distribution, and (ii) a second count indicative of a number of the data bits that are inverted relative to corresponding bits in a previously transmitted data unit;
when the first count is one of one or more preselected values of the first count that, in accordance with the given statistical distribution, occur more frequently than remaining values of the first count, make a decision, based on both the first and the second counts, whether to invert the data bits in the data unit, depending on whether inversion of the data bits is expected to reduce power consumption of transmitting the data unit over the bus;
produce an output data unit from the data unit, by retaining or inverting the N data bits of the data unit based on the decision; and
transmit the output data unit over the data lines via the bus driver.

2. The electronic device according to claim 1, wherein the bus driver is further coupled to a control line carrying a decision signal indicative of the decision, and wherein the circuitry is configured to make the decision also based on an amount of power consumed due to transmission of the decision signal over the control line.

3. The electronic device according to claim 1, wherein the circuitry is configured to calculate, based on the first and second counts, a power cost that depends on one or more predetermined power consumption characteristics related to transmission of data units over the data lines, and to make the decision based on the power cost.

4. The electronic device according to claim 3, wherein the circuitry is configured to calculate the power cost by calculating a difference between expected amounts of power consumed when transmitting the data unit and an inverse of the data unit, respectively.

5. The electronic device according to claim 3, wherein the power consumption characteristics comprise at least (i) an amount of power consumed in transmitting a given data bit value over a data line and (ii) an amount of power consumed in toggling between data bit values over the data line.

6. The electronic device according to claim 3, wherein the circuitry is configured to determine the power consumption characteristics during training of the bus.

7. The electronic device according to claim 3, wherein the power cost comprises a linear function of variables depending on the first and second counts.

8. The electronic device according to claim 3, wherein the circuitry is configured to calculate the power cost by querying a table that is indexed by first and second indices derived from the first and second counts.

9. The electronic device according to claim 8, wherein the circuitry is configured to predefine a logical rectangle-shaped region comprising a partial subset of a decision region in the table for which entries in the table correspond to a common polarity and a common decision, and to make the decision by identifying that the first and second indices correspond to a table entry in the predefined region.

10. The electronic device according to claim 1, wherein the circuitry is configured to make the decision based on a number of zero-to-one data bit toggles in the data unit and in an inverted version of the data unit, relative to the previously transmitted data unit.

11. The electronic device according to claim 1, wherein the circuitry is configured to make the decision using a decision function that depends on one or more system parameters that have impact on the power consumption of transmitting the data unit over the bus, and to adapt the decision function upon detecting that one or more of the system parameters have been modified.

12. The electronic device according to claim 11 wherein the one or more system parameters belong to a list comprising at least: a rate of data transmission over the data lines, a termination impedance at a receiver, a drive strength impedance, parasitic capacitance of the receiver or the data lines, and a level of voltage supply.

13. The electronic device according to claim 1, wherein a zero-to-one data bit toggle has a different impact on the power consumption of transmitting the data unit over the bus compared to a one-to-zero data bit toggle, and wherein the circuitry is configured to make the decision based on at least one of a number of zero-to-one data bit toggles and a number of one-to-zero data bit toggles.

14. A method, comprising:
in an electronic device that comprises a bus driver coupled to a parallel bus comprising N data lines, wherein N comprises an integer larger than 1,
receiving a data unit comprising N data bits, for transmission over the N data lines;
determining, based at least on the data bits in the data unit, (i) a first count indicative of a number of data bits in the data unit having a predefined value, wherein values of the first count are distributed in accordance with a given statistical distribution, and (ii) a second count indicative of a number of the data bits that are inverted relative to corresponding bits in a previously transmitted data unit;
when the first count is one of one or more preselected values of the first count that, in accordance with the given statistical distribution, occur more frequently than remaining values of the first count, making a decision, based on both the first and the second counts, whether to invert the data bits in the data unit, depending on whether inversion of the data bits is expected to reduce power consumption of transmitting the data unit over the bus;
producing an output data unit from the data unit, by retaining or inverting the N data bits of the data unit based on the decision; and
transmitting the output data unit over the data lines via the bus driver.

15. The method according to claim 14, wherein the bus driver is further coupled to a control line carrying a decision signal indicative of the decision, and wherein making the decision comprises making the decision also based on an amount of power consumed due to transmission of the decision signal over the control line.

16. The method according to claim 14, and comprising calculating, based on the first and second counts, a power cost that depends on one or more predetermined power consumption characteristics related to transmission of data units over the data lines, and making the decision based on the power cost.

17. The method according to claim 16, wherein calculating the power cost comprises calculating a difference between expected amounts of power consumed when transmitting the data unit and an inverse of the data unit, respectively.

18. The method according to claim 16, wherein the power consumption characteristics comprise at least (i) an amount of power consumed in transmitting a given data bit value over a data line and (ii) an amount of power consumed in toggling between data bit values over the data line.

19. The method according to claim 16, and comprising determining the power consumption characteristics during training of the bus.

20. The method according to claim 16, wherein the power cost comprises a linear function of variables depending on the first and second counts.

21. The method according to claim 16, wherein calculating the power cost comprises querying a table that is indexed by first and second indices derived from the first and second counts.

22. The method according to claim 21, and comprising predefining a logical rectangle-shaped region comprising a partial subset of a decision region in the table for which entries in the table correspond to a common polarity and a common decision, and making the decision by identifying that the first and second indices correspond to a table entry in the predefined region.

23. The method according to claim 14, wherein making the decision comprises making the decision based on a number of zero-to-one data bit toggles in the data unit and in an inverted version of the data unit, relative to the previously transmitted data unit.

24. The method according to claim 14, wherein making the decision comprises making the decision using a decision function that depends on one or more system parameters that have impact on the power consumption of transmitting the data unit over the bus, and adapting the decision function upon detecting that one or more of the system parameters have been modified.

25. The method according to claim 24 wherein the one or more system parameters belong to a list comprising at least: a rate of data transmission over the data lines, a termination impedance at a receiver, a drive strength impedance, parasitic capacitance of the receiver or the data lines, and a level of voltage supply.

26. The method according to claim 14, wherein a zero-to-one data bit toggle has a different impact on the power consumption of transmitting the data unit over the bus compared to a one-to-zero data bit toggle, and wherein making the decision comprises making the decision based on at least one of a number of zero-to-one data bit toggles and a number of one-to-zero data bit toggles.

* * * * *